Figure 1:
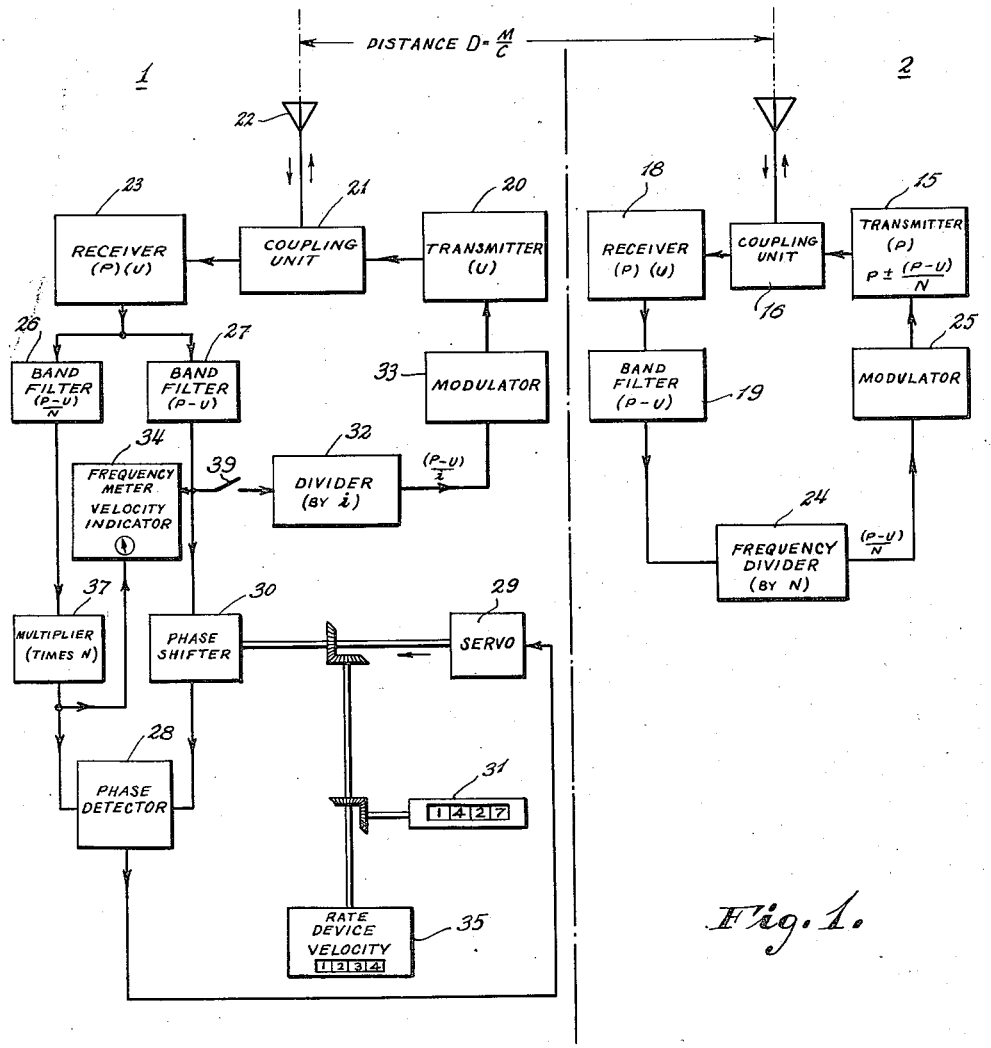
Figure 2:
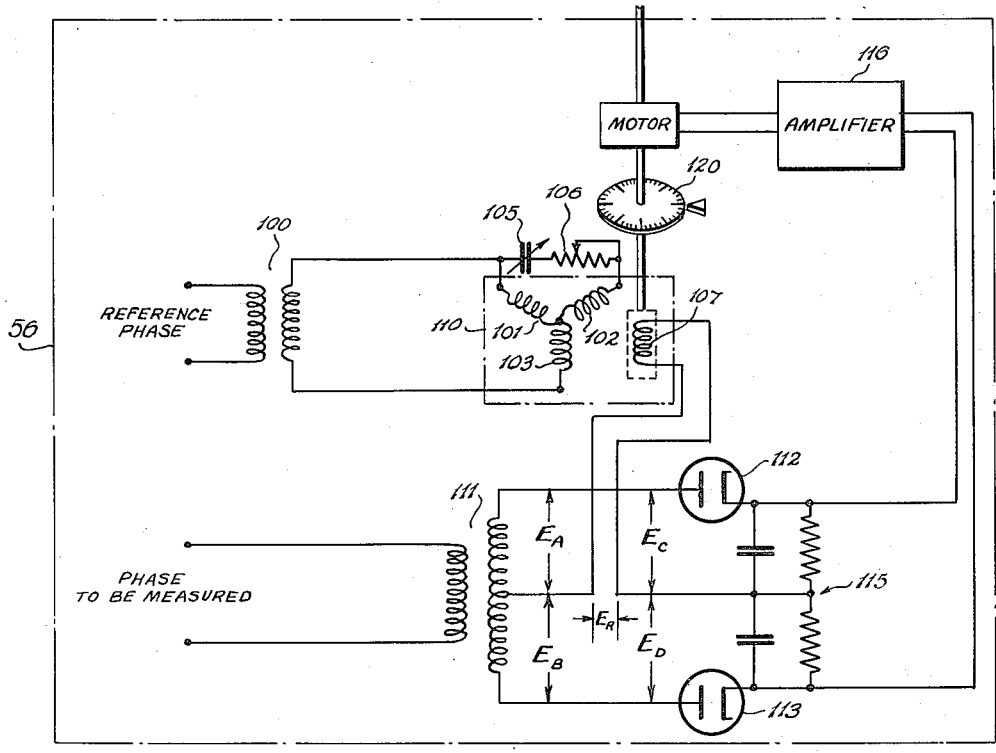
Figure 3:
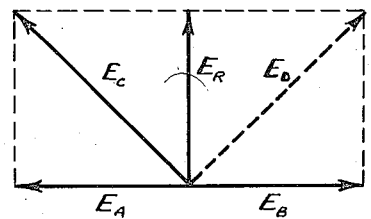
Figure 4:
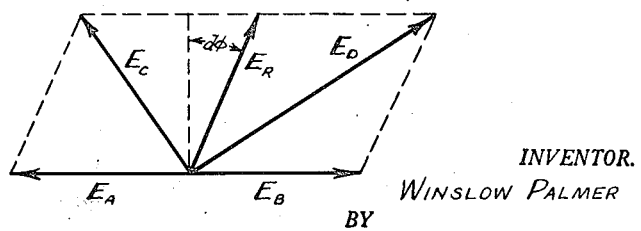

Oct. 6, 1953    W. PALMER    2,654,884
RADIO DISTANCE MEASURING SYSTEM
Filed Oct. 21, 1947    2 Sheets—Sheet 2

INVENTOR.
WINSLOW PALMER
BY
Paul B. Hunter,
ATTORNEY

Patented Oct. 6, 1953

2,654,884

UNITED STATES PATENT OFFICE 2,654,884

RADIO DISTANCE MEASURING SYSTEM

Winslow Palmer, West Hempstead, N. Y., assignor to The Sperry Corporation, a corporation of Delaware Application October 21, 1947, Serial No. 781,093

9 Claims. (Cl. 343—9)

This invention relates to radio distance and velocity determining systems and more particularly to such systems utilizing continuous wave transmissions.

Accordingly, an object of the invention is to provide means to measure the distance between two points.

Another object of the invention is to determine the relative velocity between two points at least one of which is mobile.

Another object of the invention is to determine the distance between two points, by transmitting discrete continuous wave signals from each point and comparing them in phase, to thereby measure the distance in terms of the wavelength of one of said signals.

The invention may be best understood by first stating three well-known principles.

Principle I

Given a transmitter at one location, radiating a wave and a receiver responsive to the wave at another location, the phase of the wave at the receiver is delayed relative to the phase of the wave at the transmitter, by an angle equal to the distance from the transmitter to the receiver in wavelengths.

Principle II

When two waves are mixed and the heterodyne beat is extracted, if the higher frequency component wave is shifted in phase through a certain angle, the beat frequency will shift in phase through the same angle and in the same direction; if the lower frequency component wave is shifted in phase through a certain angle, the beat frequency will shift through an equal angle but in the opposite direction.

Principle III

When a modulated wave is transmitted, the phase of the modulation frequency wave, when demodulated at the receiver, lags the modulation frequency wave at the transmitter, by an angle equal to the number of wavelengths of the modulation frequency between the transmitter and the receiver.

The proofs of these principles will not be undertaken here as they are known to the art. However the proofs are presented in the applicant's copending application No. 782,529, filed October 28, 1947, now Patent No. 2,611,127, for Radio Position Determining Systems.

The invention will be explained by means of the following specification in connection with the drawing, which is a schematic block diagram of an embodiment of the invention.

The illustrated embodiment of the invention comprises range measuring equipment shown in general at 1 which may be carried on a mobile craft, and which is adapted to cooperate with a fixed or mobile transponder at a distance D to be measured.

The transponder includes a transmitter 15 which may be of the type which transmits a frequency ($p$) either continuously, or in response to an interrogating signal. The range measuring set includes a transmitter 20 which transmits a frequency ($u$). The transmitter 20 is coupled through coupling unit 21 to an antenna 22 and also to a receiver 23 which receives both frequencies ($p$) and ($u$).

In the transponder the transmitter 15 is coupled through coupling unit 16 to antenna 17 and receiver 18. The receiver 18 receives frequencies ($p$) and ($u$) and mixes them and the filter 19 extracts the frequency ($p-u$) from the receiver output. This frequency ($p-u$) is divided by frequency divider 24, and this divided frequency $$\frac{(p-u)}{N}$$

is modulated on carrier frequency ($p$) of transmitter 15 by means of modulator 25.

The output of receiver 23 at the station 1 is connected to two filters 26 and 27, the first of which extracts the divided frequency modulation $$\frac{(p-u)}{N}$$

and the second of which derives directly the beat frequency ($p-u$). The divided frequency is multiplied to its original frequency by multiplier 37 and it is compared in phase with the directly derived frequency ($p-u$) in phase detector 28. Phase detector 28 is arranged to generate an error signal output proportional to the cosine of the difference in phase. This error signal is fed to a servo mechanism 29 which is adapted to rotate phase shifter 30, connected between filter 27 and phase detector 28. The servo system changes the phase of the output of filter 27, i. e., frequency ($p-u$), until there is a 90° phase difference and therefore no error signal. The calibrated indicator 31 geared to the output shaft of servo mechanism 29 gives a direct indication of the range, which, as will be shown, is proportional to the phase shift.

If it is desired to obtain range indications on either position as in the case of two mobile craft, the transponder 2 may be eliminated and a range indicating set 1, as modified by the switch 39 connection, may be used at each location thereby providing range indications of the distance at each location.

The switch 39 circuit comprises the addition of frequency dividing mechanism 32 which is connected to the output of filter 27 and adapted to divide it by another factor $(i)$. This divided frequency is then modulated upon the output of transmitter 20 by means of modulator 33, thus providing a phase reference modulation signal from each end of the distance to be measured. The receiver at the other location would have to have a filter responsive to $$\frac{(p-u)}{i}$$

instead of filter 26 which is responsive to $$\frac{(p-u)}{N}$$

A direct reading of velocity may be obtained by connecting a frequency meter 34 between the output of filter 27 and the output of multiplier 37. This frequency meter will measure the rate of change of phase, i. e., the difference in frequency between the output of filter 27 and the frequency-multiplied output of filter 26, that is, the Doppler shift frequency. The indications of meter 34 must be calibrated in speed units based on the relation of the Doppler shift frequency to the basic carrier frequency.

The velocity indication may also be obtained by mechanically measuring the rate of change of range. This may be done by gearing a calibrated rate device 35 to the range indicator 31.

The operation of the described system may be analyzed as follows:

Transmitter 15 generates a frequency $(p)$ according to the following equation:

$$e_p = E_p \sin 2\pi p t \qquad (a)$$

Transmitter 20 generates a frequency $(u)$ according to the following equation:

$$e_u = E_u \sin 2\pi u t \qquad (b)$$

The frequency $(u)$ is received by receiver 18, delayed in phase proportionally to the time M and it appears in receiver 18 as follows:

where $$M = \frac{\text{Distance}}{\text{Velocity of Propagation}}$$

$$e_{u_{18}} = E_u \sin 2\pi u (t-M) \qquad (c)$$

The frequency $(p)$ is received at location 1 delayed in phase proportionally to time M and it appears in the receiver 23 as:

$$e_{p_{23}} = E_p \sin 2\pi p (t-M) \qquad (d)$$

The signals represented by Equations $a$ and $c$ are combined in receiver 18 and filter 19 producing a beat frequency of the form of Equation $e$:

$$e_{18} = E_{18} \cos [2\pi pt - 2\pi u(t-M)] \qquad (e)$$

This beat frequency is then divided by frequency divider 24 for purposes of identification. This division factor will be neglected as it is not necessary for this analysis.

The beat signal represented by Equation $e$ is modulated upon carrier $(p)$ of transmitter 15 producing a modulation term as follows:

$$e_{m_{15}} = E_{m_{15}} \cos [2\pi pt - 2\pi u(t-M)] \qquad (f)$$

This modulation is received by receiver 23 having been delayed in phase proportional to time M, in the following form:

$$e_{m_{23}} = E_{m_{23}} \cos [2\pi p(t-M) - 2\pi u(t-2M)] \qquad (g)$$

and it is separated by filter 26 multiplied by multiplier 37 and then applied to one input of phase detector 28.

The other term applied to phase detector 28 is derived from receiver 23 by filter 27 and it is the beat frequency received at location 1 comprising Equation $b$ and Equation $d$, of the form $$e_{27} = E_{27} \cos [2\pi p(t-M) - 2\pi ut] \qquad (h)$$

The signals corresponding to Equations $g$ and $h$ are compared in phase in detector 28, measuring the difference phase angle $\theta$, as follows:

$$\theta = 2\pi p(t-M) - 2\pi ut - [2\pi p(t-M) - 2\pi u(t-2M)] \qquad (i)$$

$$\theta = 2\pi u(2M) \qquad (j)$$

Therefore $\theta$ is proportional to M and therefore also to D where D is measured in wavelengths of frequency $(u)$. $\qquad (k)$ By way of example, assume that the frequencies $p$ and $u$ of the transmitters 15 and 20 are 100 and 101 kilocycles per second respectively. Then the beat frequency is one kilocycle per second. The phase shift of the 101 kc. wave in going from station 1 to station 2 is $$101000 \times \frac{M}{10^6} \times 360 = 36.36M \text{ degrees}$$

where M is the travel time in microseconds. Therefore the one kilocycle beat signal at the output of the receiver 18 is delayed in phase by 36.36M degrees with respect to what it would be if the distance between the stations were zero.

This one kilocycle signal is divided in the frequency divider 24 by some integer, for example five, making a 200 cycle signal whose phase relationship is fixed with respect to the one kilocycle signal. The 200 cycle signal is impressed as modulation on the 100 kc. output of the transmitter 15, and travels with it to station 1, incurring the transit time delay M. Its phase delay in this passage is $$200 \frac{M}{10^6} \times 360 = .072M \text{ degrees}$$

At station 1, the 200 cycle signal is multiplied in the frequency multiplier 37 by the factor of five. This converts the 200 cycle signal, delayed .072M degrees with respect to the transmitted 200 cycle signal, to a one kilocycle signal, delayed $5 \times .072M = .36M$ degrees with respect to the one kilocycle signal from which it was originally derived. This reproduced one kilocycle signal therefore has a total phase delay of $$36.36M + .36M = 36.72M$$

degrees with respect to what it would be if the distance were zero.

The 100 kilocycle wave produced by the transmitter 15 is delayed 36M degrees in going from station 2 to station 1. Accordingly, the one kilocycle beat signal in the output of receiver 23 is advanced 36M degrees with respect to what it would be if the distance were zero, because the lower frequency (100 kc.) wave is the one that has been delayed.

The difference in phase between this signal, which was advanced 36M degrees, and the other, which was retarded 36.72M degrees, is 72.72M degrees, and is numerically equal to twice the phase delay of the 101 kilocycle signal in travelling from station 1 to station 2. With the assumed frequencies, each degree of phase difference between the two one kilocycle signals at station 1 represent a round-trip transit time of $$\frac{1}{72.72}$$

microseconds, corresponding to a distance between the stations of about 6.93 feet. By suitable selection of the gear ratio between the phase shifter 30 and the indicator 31 with regard to the frequency $u$, the indicator may be calibrated directly in units of distance, such as feet.

If the frequencies $p$ and $u$ were interchanged, the operation would be substantially as described, except that the difference in phase between the one kilocycle signals at station 1 would be 72M degrees, i. e. twice the one-way phase delay of the 100 kilocycle signal.

Since the phase difference between the one kilocycle signals is proportional to the distance, the rate of change of this phase difference is a measure of the velocity, which may be indicated by either the frequency meter 34 or the rate indicating device 35.

The frequency divider 24 and the multiplier 37 enable the beat signal produced at station 2 to be transmitted on the carrier of transmitter 15 without producing side bands that interfere with the beat signal produced at station 1.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Distance measuring equipment adapted to indicate the distance between two locations comprising means at a first location to transmit a first continuous wave signal, means at a second location to transmit a second continuous wave signal of slightly different frequency, means at said second location to receive both signals, means responsive to said receiving means to obtain a beat frequency between said signals, means adapted to transmit said beat frequency as a modulation, means at said first location to receive said first and second continuous wave signals and said modulation, means responsive to said last named receiving means to mix said first and second continuous wave signals and obtain the beat frequency, means to compare in phase said directly derived difference frequency wave with said received modulation difference frequency wave, and means to indicate the distance between said locations as a function of said phase difference.

2. A system for measuring distance between locations by radio means comprising means for transmitting a first continuous wave signal from a first location, means for transmitting a second continuous wave signal from second location, means for receiving both of said signals at said second location, means for heterodyning said signals to obtain a beat frequency, means for transmitting signals proportional to said beat frequency to said first location as a modulation of said second continuous wave signal, means for receiving said first continuous wave signals and said modulation at said first location, means for heterodyning said first and second continuous wave signals at said second location to directly derive the beat frequency, and means for comparing in phase the directly derived difference frequency with the difference frequency modulation, said phase difference thereby giving an indication of the distance between said locations.

3. Distance measuring equipment adapted to measure the distance between two locations comprising means at a first location to transmit a first wave, means at a second location to transmit a second wave of slightly different frequency, means at said second location to receive both of said waves, means responsive to said receiving means to obtain a beat frequency between said waves, means for converting said beat frequency to a different frequency having a fixed relationship to said beat frequency, means for transmitting said converted beat frequency as a modulation on said second wave, means at said first location to receive said waves and said modulation, means responsive to said last named receiving means to mix said waves and obtain the difference frequency, means for reconverting said modulation to said beat frequency, and means to compare in phase said directly derived difference frequency with said received reconverted modulation difference frequency.

4. The invention set forth in claim 3, wherein said means for converting said beat frequency to a different frequency is a frequency divider, and said means for reconverting said modulation to said beat frequency includes a frequency multiplier.

5. A system for measuring distance between two points comprising means for transmitting waves of discrete frequency from the opposite ends of the distance to be measured, means for deriving a beat frequency of said waves from one location and transmitting it as a modulation, means for deriving the same beat frequency of said waves at the second location, means for receiving said modulation beat frequency at said second location, and means for comparing said directly derived beat frequency and said modulation beat frequency in phase to thereby determine the distance in terms of the wavelength of one of said signals.

6. A system for measuring distance and relative velocity between two points, at least one of which may be mobile, comprising means for transmitting first waves of discrete frequency from the opposite ends of the distance to be measured, means for deriving a beat frequency of said waves at one location and transmitting it as a modulation, means for deriving the same beat frequency of said waves at the other location, means for receiving said modulation beat frequency at said other location, means for measuring the phase difference of said directly derived beat frequency and said modulation beat frequency, to thereby determine the distance in terms of wavelength of one of said first waves, and means for measuring the rate of change of phase between them to thereby determine the relative velocity of said two points.

7. Apparatus for measuring relative velocity between two points comprising means for transmitting first and second signals of different frequencies from the respective points, means for deriving a beat frequency of said signals at one point and transmitting it as a modulation, means for deriving the same beat frequency of said signals at the second point, means for receiving said modulation beat frequency at said second location and measuring the rate of change of phase of said directly derived beat frequency and said modulation beat frequency to thereby determine the relative velocity of said points.

8. The invention set forth in claim 7, wherein said means for measuring the rate of change of phase of said directly derived beat frequency and said modulation beat frequency includes a frequency meter connected to measure the difference in frequency between said beat frequencies.

9. Apparatus for determining distance by radio means comprising means for transmitting signals from two separate locations, means for mixing said signals at said locations thereby obtaining certain modulation products, means for retransmitting said modulation products from one of said locations, means for separately receiving said retransmitted modulation products at the other of said locations and comparing them in phase with said locally derived modulation products, the phase difference being a function of the distance between said locations.

WINSLOW PALMER.

References Cited in the file of this patent

UNITED STATES PATENTS

| Number | Name | Date |
| --- | --- | --- |
| 1,750,668 | Green | Mar. 18, 1930 |
| 2,151,323 | Hollmann | Mar. 21, 1939 |
| 2,198,113 | Holmes | Apr. 23, 1940 |
| 2,248,727 | Strobel | July 8, 1941 |
| 2,259,982 | Alexanderson | Oct. 21, 1941 |
| 2,268,587 | Guanella | Jan. 6, 1942 |
| 2,405,239 | Seeley | Aug. 6, 1946 |
| 2,412,003 | Neufeld | Dec. 3, 1946 |
| 2,435,615 | Varian | Feb. 10, 1948 |
| 2,470,787 | Nosker | May 24, 1949 |

FOREIGN PATENTS

| Number | Country | Date |
| --- | --- | --- |
| 581,568 | Great Britain | Oct. 17, 1946 |

OTHER REFERENCES

Hastings: "Raydist-a Radio Navigation and Tracking System, Tele. Tech., June 1947, pages 30–33 and 100–103.